US012288426B2

(12) United States Patent
Imai et al.

(10) Patent No.: US 12,288,426 B2
(45) Date of Patent: Apr. 29, 2025

(54) INSPECTION ASSISTANCE PROGRAM, INSPECTION ASSISTANCE SYSTEM, AND INSPECTION ASSISTANCE APPARATUS CONTROL METHOD

(71) Applicant: ISUZU MOTORS LIMITED, Tokyo (JP)

(72) Inventors: Akira Imai, Fujisawa (JP); Masakazu Ishimaru, Fujisawa (JP); Hideto Hirahara, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 250 days.

(21) Appl. No.: 17/618,816

(22) PCT Filed: Jun. 10, 2020

(86) PCT No.: PCT/JP2020/022789
§ 371 (c)(1),
(2) Date: Dec. 13, 2021

(87) PCT Pub. No.: WO2020/250921
PCT Pub. Date: Dec. 17, 2020

(65) Prior Publication Data
US 2022/0237955 A1 Jul. 28, 2022

(30) Foreign Application Priority Data
Jun. 13, 2019 (JP) .................................. 2019-110525

(51) Int. Cl.
*G07C 5/00* (2006.01)
*G07C 5/12* (2006.01)
(Continued)

(52) U.S. Cl.
CPC ............... *G07C 5/008* (2013.01); *G07C 5/12* (2013.01); *H04N 7/183* (2013.01); *H04N 23/56* (2023.01)

(58) Field of Classification Search
CPC .......... G07C 5/008; G07C 5/12; H04N 23/56; H04N 7/183
(Continued)

(56) References Cited

U.S. PATENT DOCUMENTS

2013/0109970 A1  5/2013  Higuchi et al.
2016/0283062 A1  9/2016  Shioiri et al.
(Continued)

FOREIGN PATENT DOCUMENTS

CN    103118598 A    5/2013
CN    105793882 A    7/2016
(Continued)

OTHER PUBLICATIONS

English Translation for JP-2009243918-A (Year: 2023).*
(Continued)

*Primary Examiner* — Mahmoud S Ismail
(74) *Attorney, Agent, or Firm* — PROCOPIO, CORY, HARGREAVES & SAVITCH LLP

(57) ABSTRACT

This inspection assistance program for assisting inspection of a vehicle causes a computer to function as: a display control unit 272 that causes a display unit 25 to display a selection screen for selecting one inspection execution item from a plurality of inspection items; and a device control unit 273 that causes a device provided to the computer and associated with the inspection execution item selected on the selection screen to operate. When a liquid amount of a battery of the vehicle is selected as an inspection execution item on the selection screen, the device control unit 273 may turn on a light 22 as a device associated with the inspection
(Continued)

execution item. The device control unit 273 may activate an imaging device 23 that generates an image as the device associated with the inspection execution item.

4 Claims, 11 Drawing Sheets

(51) Int. Cl.
  *H04N 7/18*    (2006.01)
  *H04N 23/56*   (2023.01)
(58) Field of Classification Search
  USPC .......................................................... 701/31.4
  See application file for complete search history.

(56) References Cited

U.S. PATENT DOCUMENTS

| | | |
|---|---|---|
| 2017/0116792 A1 | 4/2017 | Jelinek et al. |
| 2018/0075675 A1* | 3/2018 | Kim .......................... G01S 7/40 |
| 2019/0130670 A1 | 5/2019 | Takao et al. |

FOREIGN PATENT DOCUMENTS

| | | | |
|---|---|---|---|
| JP | 2004362347 A | * | 12/2004 |
| JP | 2007-118887 A | | 5/2007 |
| JP | 2009243918 A | * | 10/2009 |
| JP | 2015-225467 A | | 12/2015 |
| JP | 2017-198526 A | | 11/2017 |
| JP | 2018-119866 A | | 8/2018 |

OTHER PUBLICATIONS

English Translation for JP-2004362347-A (Year: 2023).*
Patent Cooperation Treaty, International Search Report, Application No. PCT/JP2020/022789, dated Sep. 8, 2020, in 5 pages.
Patent Cooperation Treaty, Written Opinion, Application No. PCT/JP2020/022789, dated Sep. 8, 2020, in 5 pages.
National Intellectual Property Administration, Notification of the First Office Action, Application No. CN202080043847.1, dated Jun. 29, 2023, in 19 pages.
Japanese Patent Office, Notice of Reasons for Refusal, Application No. JP 2019-110525, dated Apr. 5, 2022, in 6 pages.
German Patent and Trademark Office, Office Action, Application No. DE 11 2020 002 873.9, dated Jan. 22, 2024, in 13 pages.

* cited by examiner

FIG. 6

PRE-OPERATION INSPECTION

INSPECT LIQUID AMOUNT OF BATTERY

CONTENTS OF INSPECTION

PLEASE CHECK WHETHER POSITION OF LIQUID LEVEL OF BATTERY IS APPROPRIATE

TURN ON LIGHT SO AS TO EASILY SEE LIQUID LEVEL

PRE-OPERATION INSPECTION

INSPECT FAN DRIVE OIL

CONTENTS OF INSPECTION

RECORD IMAGE

PLEASE CHECK WHETHER POSITION OF LIQUID LEVEL OF FAN DRIVE OIL IS APPROPRIATE

PLEASE PHOTOGRAPH OIL RESERVOIR TANK SUCH THAT POSITION OF LIQUID LEVEL CAN BE SEEN

OK  NG

INSPECTION ASSISTANCE PROGRAM, INSPECTION ASSISTANCE SYSTEM, AND INSPECTION ASSISTANCE APPARATUS CONTROL METHOD

CROSS-REFERENCE TO RELATED APPLICATIONS

This application is US National Stage of International Patent Application PCT/JP2020/022789, filed Jun. 10, 2020, which claims benefit of priority from Japanese Patent Application JP2019-110525, filed Jun. 13, 2019, the contents of both of which are incorporated herein by reference.

TECHNICAL FIELD

The present disclosure relates to an inspection assistance program, an inspection assistance system, and a method for controlling an inspection assistance apparatus, in which the inspection assistance program, the inspection assistance system, and the inspection assistance apparatus assist inspection of a vehicle.

BACKGROUND ART

A user of a commercial vehicle such as a truck needs to perform a pre-operation inspection. A vehicle inspection assistance apparatus that displays an input screen for inputting an inspection result of a pre-operation inspection is known (for example, Patent Literature 1).

CITATION LIST

Patent Literature

Patent Literature 1: JP-A-2007-118887

SUMMARY OF INVENTION

Technical Problem

Depending on an inspection item of the pre-operation inspection, an instrument such as a light may be used. In the invention described in Patent Literature 1, it is necessary to prepare an instrument for performing inspection of such an inspection item.

The present disclosure has been made in view of the above circumstances, and an object thereof is to provide an inspection assistance program, an inspection assistance system, and a method for controlling an inspection assistance apparatus that can facilitate inspection of an inspection item that requires an instrument.

Solution to Problem

An inspection assistance program according to a first aspect of the present disclosure is an inspection assistance program for assisting inspection of a vehicle, the inspection assistance program causing a computer to function as: a display control unit configured to cause a display unit to display a selection screen for selecting one to-be-performed inspection item from a plurality of inspection items; and a device control unit configured to cause a device that is provided in the computer and that is associated with the to-be-performed inspection item selected on the selection screen to operate.

When inspection of a liquid amount of a battery of the vehicle is selected as the to-be-performed inspection item on the selection screen, the device control unit may cause a light to be turned on as the device associated with the to-be-performed inspection item. The device control unit may cause an image-capturing device configured to generate an image to be activated as the device associated with the to-be-performed inspection item.

The inspection assistance program may further cause the computer to function as a transmission unit configured to transmit the image generated by the image-capturing device to an external apparatus related to the inspection in association with the to-be-performed inspection item.

An inspection assistance system according to a second aspect of the present disclosure is an inspection assistance system for assisting inspection of a vehicle, the inspection assistance system including: an inspection assistance apparatus; and a management apparatus for managing the inspection, in which the inspection assistance apparatus includes a display unit configured to display a selection screen for selecting one to-be-performed inspection item from a plurality of inspection items, and in which the management apparatus includes a display control unit configured to cause the display unit to display the selection screen, and a device control unit configured to cause a device of the inspection assistance apparatus associated with the to-be-performed inspection item selected on the selection screen to operate.

A control method according to a third aspect of the present disclosure is a method for controlling an inspection assistance apparatus for assisting inspection of a vehicle, the control method including: by the inspection assistance apparatus, causing a display unit to display a selection screen for selecting one to-be-performed inspection item from a plurality of inspection items; and causing the inspection assistance apparatus to output a signal for operating a device associated with the to-be-performed inspection item selected on the selection screen.

A storage medium according to a fourth aspect of the present disclosure is a computer-readable storage medium that stores an inspection assistance program readable by a computer for assisting inspection of a vehicle, and when the program is executed by the computer, the program causes a display unit of the inspection assistance apparatus to display a selection screen for selecting one to-be-performed inspection item from a plurality of inspection items, and causes a device that is provided in the computer and that is associated with the to-be-performed inspection item selected on the selection screen to operate.

Advantageous Effects of Invention

According to the present disclosure, it is possible to achieve an effect of facilitating inspection of an inspection item that requires an instrument.

BRIEF DESCRIPTION OF DRAWINGS

FIG. 6 is a diagram showing an example of a screen caused to be displayed by the display control unit.

FIG. 8 is a diagram showing an example in which the device control unit causes the device to operate.

DESCRIPTION OF EMBODIMENTS

[Outline of Inspection Assistance System]

Figure 1:
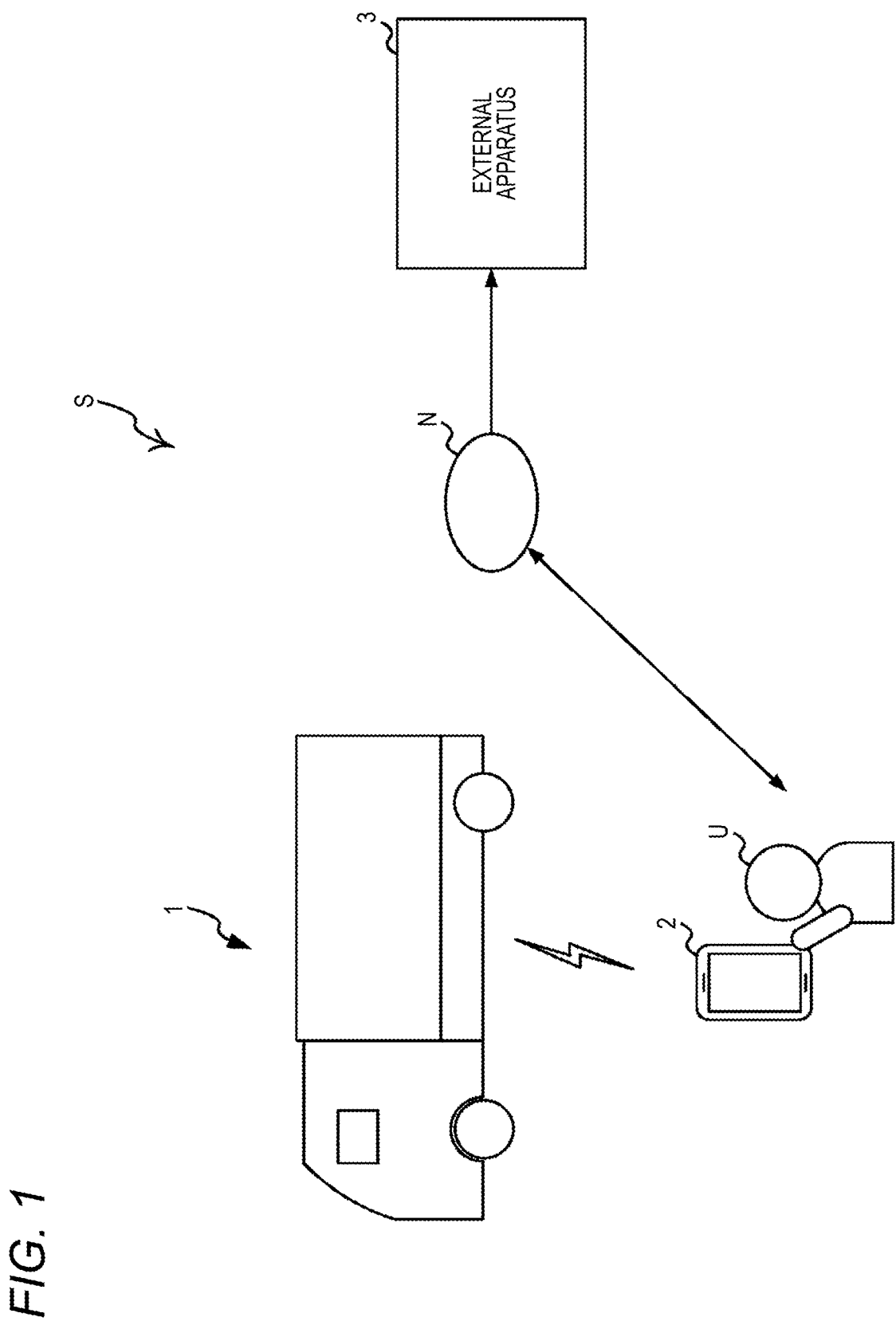
FIG. 1 is a diagram showing a configuration of an inspection assistance system of an embodiment.

FIG. 1 is a diagram showing a configuration of an inspection assistance system S of the present embodiment. The inspection assistance system S includes an inspection assistance apparatus 2 for assisting inspection of a vehicle 1 and an external apparatus 3 related to the inspection of the vehicle 1. The vehicle 1 is a commercial vehicle, and is, for example, a truck. The inspection assistance apparatus 2 is an apparatus managed by a business operator who inspects the vehicle 1, and is, for example, an information terminal such as a smartphone or a tablet.

When an inspection application software (hereinafter, referred to as "inspection application") is activated, the inspection assistance apparatus 2 displays an inspection item and an inspection method in a pre-operation inspection of the vehicle 1 on a display. The inspection assistance apparatus 2 receives an operation of a user U who inputs an inspection result.

The inspection assistance apparatus 2 communicates with the vehicle 1 by wireless communication via an in-vehicle wireless device mounted on the vehicle 1. For example, the inspection assistance apparatus 2 communicates with the vehicle 1 by Wi-Fi (registered trademark) or Bluetooth (registered trademark). The inspection assistance apparatus 2 transmits information for changing a state of equipment of the vehicle 1 to the vehicle 1 by, for example, wireless communication.

The inspection assistance apparatus 2 may capture an image of a state of the vehicle 1 for some inspection items. The inspection assistance apparatus 2 transmits a captured image of the state of the vehicle 1, an inspection result of the vehicle 1, and the like to the external apparatus 3 via a network N. The external apparatus 3 is connected to the inspection assistance apparatus 2 via the network N. The external apparatus 3 acquires the captured image of the state of the vehicle 1, the inspection result of the vehicle 1, and the like from the inspection assistance apparatus 2.

Figure 2:
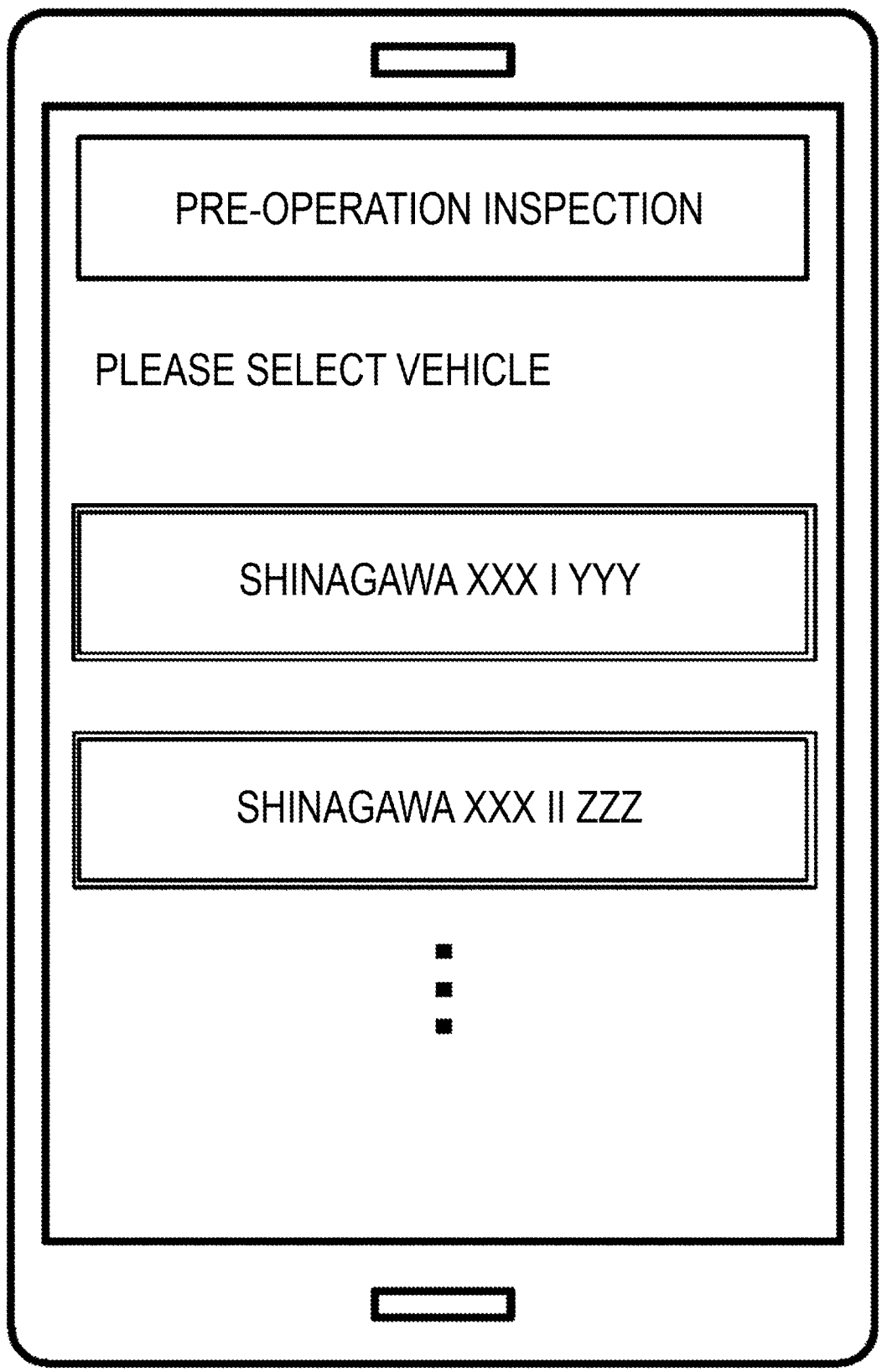
FIG. 2 is a diagram showing a screen displayed by an inspection assistance apparatus immediately after an inspection application is activated.

FIG. 2 is a diagram showing a screen displayed by the inspection assistance apparatus 2 immediately after the inspection application is activated. As shown in FIG. 2, the inspection assistance apparatus 2 first displays a screen for selecting the vehicle 1 that is to be subjected to the pre-operation inspection. In an example of FIG. 2, an operation key for selecting a vehicle with vehicle registration information of "Shinagawa XXX I YYY" and an operation key for selecting a vehicle with vehicle registration information of "Shinagawa XXX II ZZZ" are displayed. The vehicle registration information is information for identifying a vehicle. The vehicle registration information is registered in advance by an administrator of the inspection assistance system S.

When an operation for selecting the vehicle 1 is performed in the screen of FIG. 2, an inspection item necessary for the selected vehicle 1 is displayed. A user U performs inspection corresponding to the displayed inspection item, and inputs an inspection result to the inspection assistance apparatus 2. Details of a mode in which the inspection assistance apparatus 2 displays an inspection item will be described later.

[Configuration of Vehicle]

Figure 3:
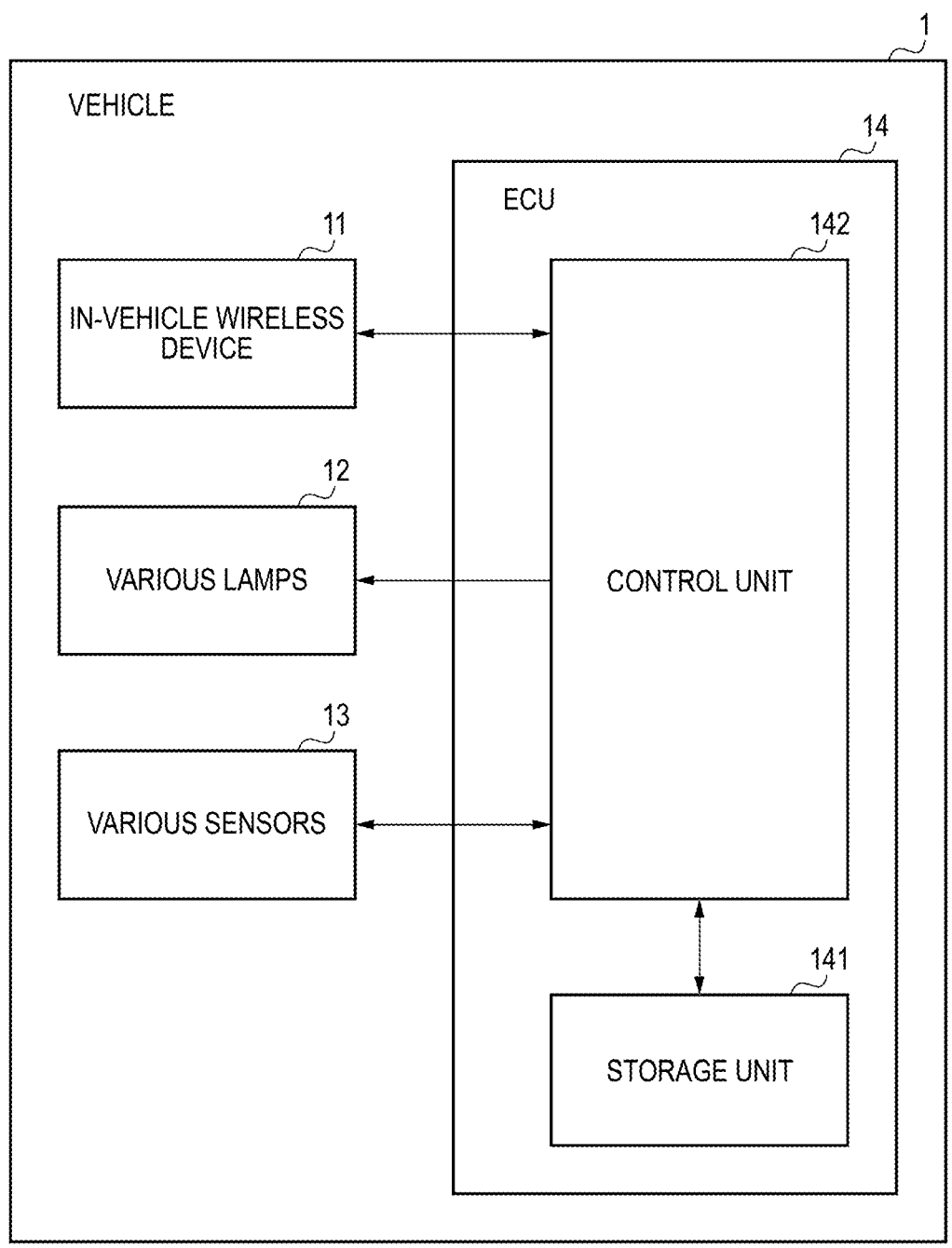
FIG. 3 is a diagram showing a configuration of a vehicle.

FIG. 3 is a diagram showing a configuration of the vehicle 1. The vehicle 1 includes an in-vehicle wireless device 11, various lamps 12, various sensors 13, and an electronic control unit (ECU) 14. The ECU 14 includes a storage unit 141 and a control unit 142.

The in-vehicle wireless device 11 is a device for communicating with the inspection assistance apparatus 2 by wireless communication. The in-vehicle wireless device 11 transmits information notified from the control unit 142 to the inspection assistance apparatus 2. Further, the in-vehicle wireless device 11 notifies the control unit 142 of information received from the inspection assistance apparatus 2. The in-vehicle wireless device 1I may transmit the information notified from the control unit 142 to an apparatus other than the inspection assistance apparatus 2 (for example, a server).

The various lamps 12 include, for example, a brake lamp, a backlight, and the like. The various sensors 13 include, for example, a sensor for detecting depression of a brake pedal, a sensor for detecting that gear is put into reverse, and the like.

The ECU 14 is a control device for electronically controlling units of the vehicle 1 by a computer. The storage unit 141 is configured with, for example, a read only memory (ROM) and a random access memory (RAM). The storage unit 141 stores various programs and various types of data for causing the control unit 142 to function.

The control unit 142 controls each unit of the vehicle 1 by executing a program stored in the storage unit 141. For example, the control unit 142 turns on or turns off the various lamps 12 based on information received from the inspection assistance apparatus 2 via the in-vehicle wireless device 11.

[Configuration of Inspection Assistance Apparatus]

Figure 4:
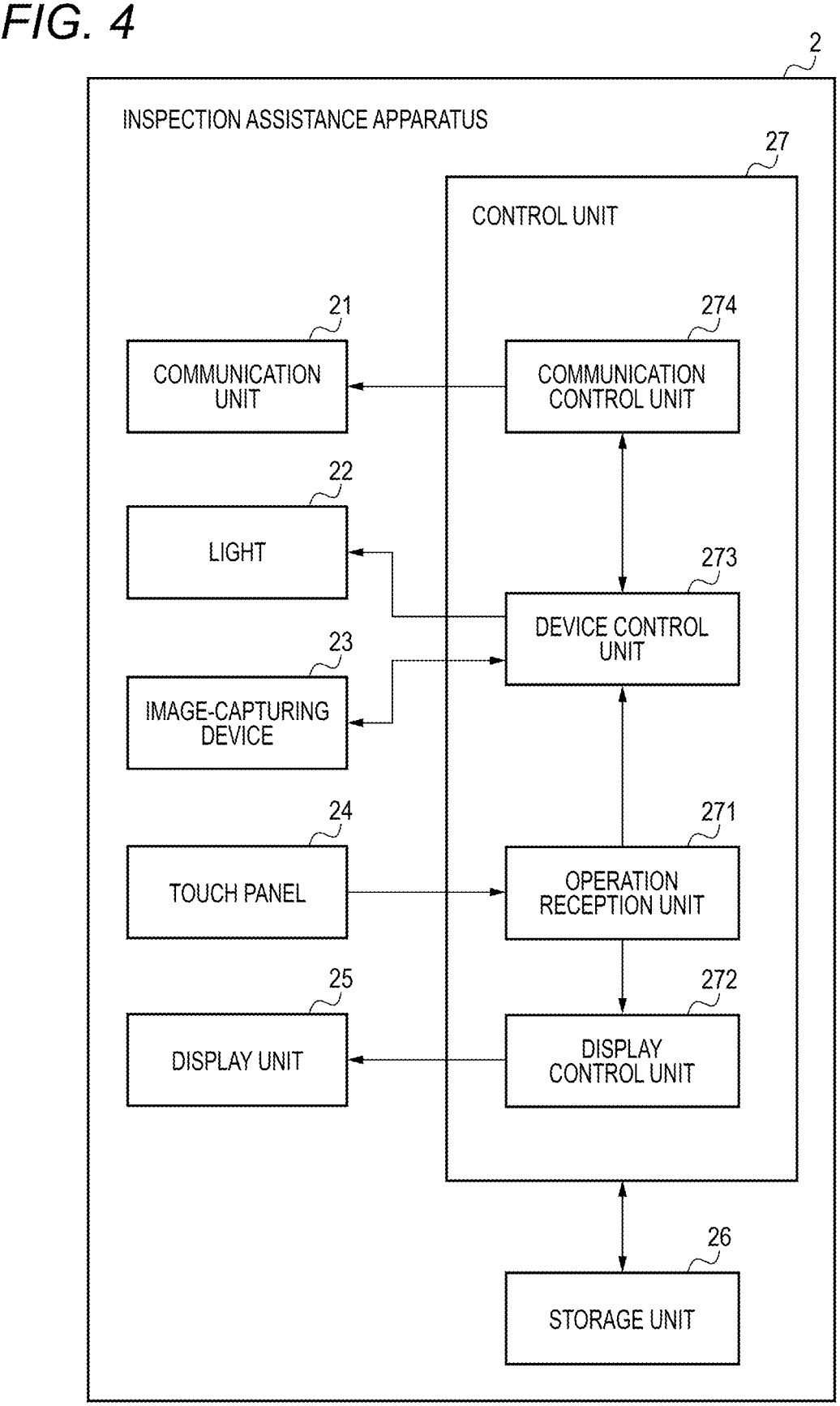
FIG. 4 is a diagram showing a configuration of the inspection assistance apparatus.

FIG. 4 is a diagram showing a configuration of the inspection assistance apparatus 2. The inspection assistance apparatus 2 includes a communication unit 21, a light 22, an image-capturing device 23, a touch panel 24, a display unit 25, a storage unit 26, and a control unit 27.

The communication unit 21 is a communication module for communicating with the vehicle 1. The light 22 radiates light. The image-capturing device 23 is a camera that generates an image. The touch panel 24 detects a touch operation on the display unit 25. The display unit 25 is a display for displaying an image. The storage unit 26 is configured with, for example, a ROM and a RAM.

The control unit 27 is, for example, a central processing unit (CPU). The control unit 27 functions as an operation reception unit 271, a display control unit 272, a device control unit 273, and a communication control unit 274 by executing a program stored in the storage unit 26. The operation reception unit 271 receives an operation input to the touch panel 24. For example, the operation reception unit 271 receives an input of an inspection result of each of a plurality of inspection items.

Figure 5A:
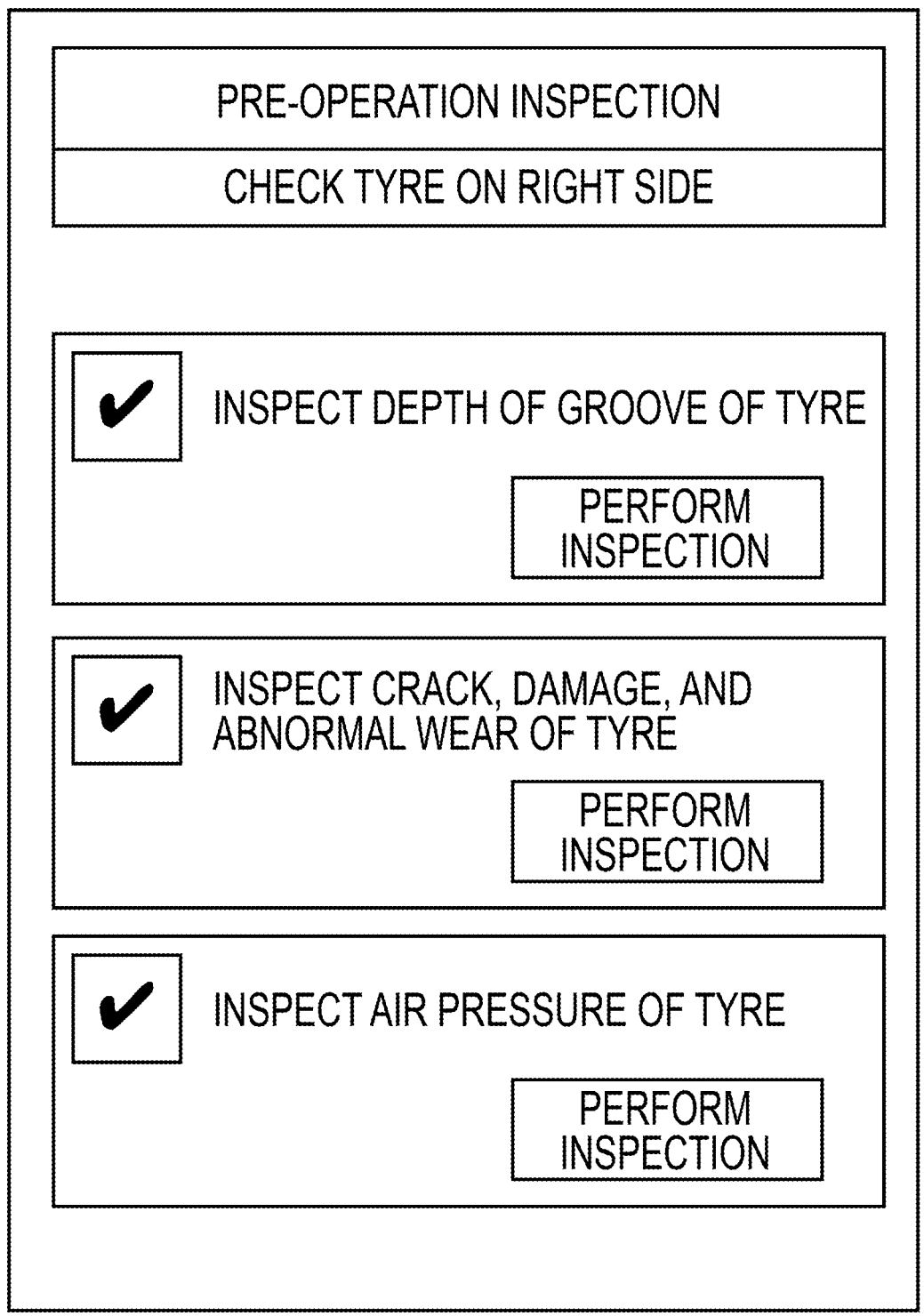
FIG. 5A is a diagram showing an example of a screen caused to be displayed by a display control unit.
Figure 5B:
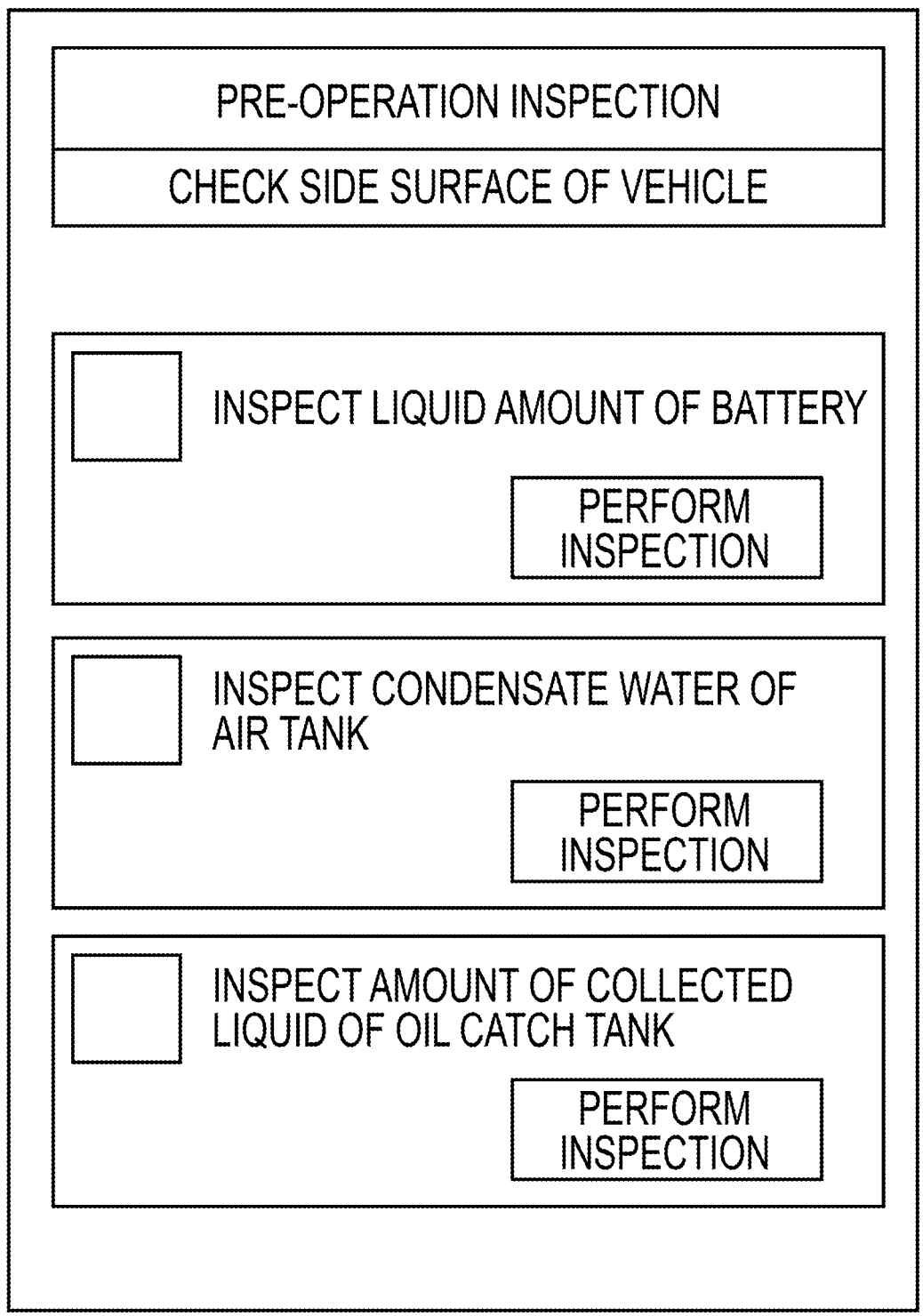
FIG. 5B is a diagram showing an example of a screen caused to be displayed by the display control unit.

The display control unit 272 causes the display unit 25 to display a selection screen for selecting one inspection item from the plurality of inspection items. Hereinafter, the selected inspection item is referred to as a to-be-performed inspection item. FIGS. 5A, 5B, and 6 are diagrams showing examples of screens caused to be displayed by the display control unit 272. FIGS. 5A and 5B are diagrams showing examples of the selection screen. The selection screen of FIG. 5A includes a plurality of inspection items.

It is assumed that all of the plurality of inspection items displayed in FIG. 5A have already been performed. A check mark indicating that inspection has been performed is attached to a rectangular display field in an upper left portion of each inspection item.

When receiving an operation of tapping a vicinity of a right end of the selection screen of FIG. 5A, the display control unit 272 causes the selection screen of FIG. 5B to be displayed. No inspection of the plurality of inspection items displayed in FIG. 5B has been performed. Therefore, no check mark indicating that the inspection has been performed is attached to the rectangular display field in the upper left portion of each inspection item.

A plurality of "perform inspection" keys are arranged on the selection screen. The "perform inspection" key is for selecting a corresponding inspection item. For example, when the operation reception unit 271 receives an operation of selecting a first inspection item "inspection of liquid amount of battery" from a top in FIG. 5B, the display control unit 272 causes an execution screen shown in FIG. 6 to be displayed.

FIG. 6 is a diagram showing an example of the execution screen caused to be displayed by the display control unit 272. In an example of FIG. 6, an execution screen for executing inspection of the inspection item "inspection of liquid amount of battery" is shown. The display control unit 272 causes, an "OK" key for receiving an input indicating that the liquid amount of the battery is appropriate and an "NG" key for receiving an input indicating that the liquid amount of the battery is not appropriate, to be displayed on the execution screen.

[Activation of Device]

The device control unit 273 causes a device provided in the inspection assistance apparatus 2 to operate during the pre-operation inspection. The device is, for example, the light 22. In the inspection of the battery liquid amount, when a battery container is opaque, there is a problem that it is difficult to check a liquid level. In the related art, measures such as checking the liquid level by shaking the vehicle 1 to vibrate the liquid level have been devised, but it has been difficult to shake a large vehicle or the like. When the light of the light 22 is radiated, a position of the liquid level is relatively easily checked.

In the storage unit 26, an inspection item and an identification ID of a device of the inspection assistance apparatus 2 useful for inspection of the inspection item are stored in association with each other. The device control unit 273 refers to the storage unit 26 and identifies a device of an identification ID associated with a to-be-performed inspection item selected on the selection screen. The device control unit 273 causes the identified device to operate.

For example, in the example of FIG. 6, when the to-be-performed inspection item "inspection of liquid amount of battery" is selected on the selection screen, the device control unit 273 causes the light 22 to be turned on as a device associated with the to-be-performed inspection item. Regarding the inspection item "inspection of liquid amount of battery", the device control unit 273 causes the light 22 to be turned on at a timing at which the operation reception unit 271 receives an operation of selecting the "perform inspection" key. With such a configuration, the user U can omit an operation of activating a device such as the light 22.

Therefore, the device control unit 273 can facilitate the inspection of the inspection item that requires an instrument.

Among the inspection items, there is an item in which it is necessary to keep an image showing a state of the vehicle 1 during inspection. For example, regarding some inspection items, the user U of the vehicle 1 may capture an image of a state of the vehicle 1 and transmit the image to the external apparatus 3 (FIG. 1), and may receive advice from an administrator who manages the vehicle 1 regarding an inspection method or a determination criterion for presence or absence of an abnormality. Further, the user U may also capture an image of the state of the vehicle 1 during inspection by the image-capturing device 23 and keep the image as a material for proving that the inspection has been performed. For this purpose, the device control unit 273 may cause the image-capturing device 23 that generates the image to be activated as a device associated with some to-be-performed inspection items.

Figure 7:
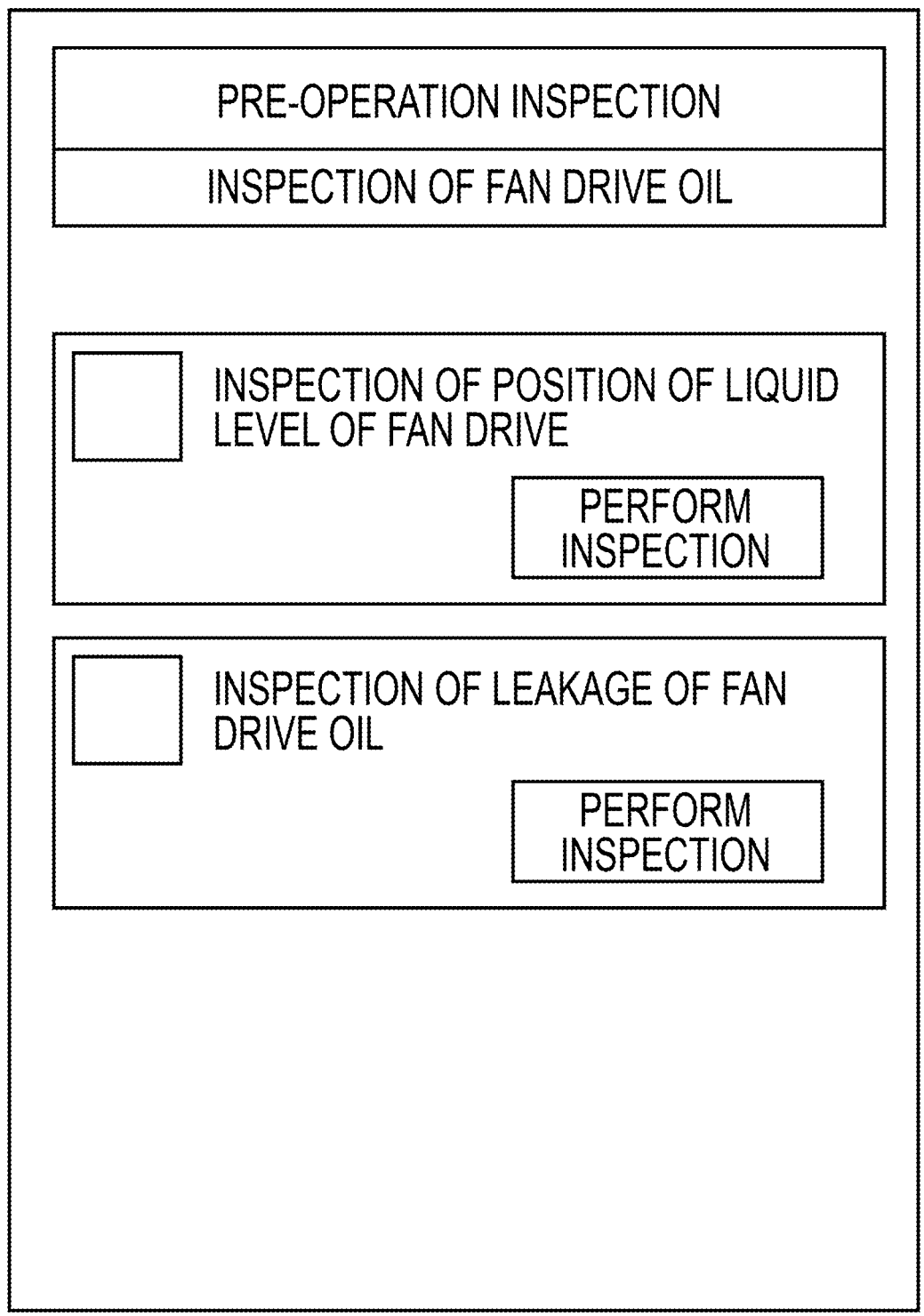
FIG. 7 is a diagram showing an example in which a device control unit causes a device to operate.

FIGS. 7 and 8 are diagrams showing an example in which the device control unit 273 causes the device to operate. A selection screen shown in FIG. 7 includes an inspection item "inspection of position of liquid level of fan drive oil" and an inspection item "inspection of leakage of fan drive oil". The fan drive oil is used for a clutch that controls a rotational speed of an engine cooling fan.

When the operation reception unit 271 receives an operation of selecting the "perform inspection" key corresponding to the inspection item "inspection of position of liquid level of fan drive oil", the execution screen of FIG. 8 is displayed. The inspection item "inspection of position of liquid level of fan drive oil" is stored in the storage unit 26 in association with the image-capturing device 23. Therefore, the device control unit 273 activates the image-capturing device 23 at a timing at which the operation reception unit 271 receives the operation of selecting the "perform inspection" key.

FIG. 8 shows an execution screen for executing inspection of the inspection item "inspection of position of liquid level of fan drive oil". The execution screen includes a "record image" key for capturing an image by the image-capturing device 23. When the operation reception unit 271 receives an operation of selecting the "record image" key, a preview screen that displays a range within which an image is captured by the image-capturing device 23 is displayed. In a state where the preview screen is displayed, an image can be captured by the image-capturing device 23. Since it takes a relatively long time to activate the image-capturing device 23, the device control unit 273 causes the image-capturing device 23 to activate at a stage before the preview screen is displayed, so that it is possible to shorten time before image-capturing is performed.

The communication control unit 274 communicates with the external apparatus 3 for managing inspection of the vehicle 1 via the communication unit 21. For example, the communication control unit 274 transmits an image generated by the image-capturing device 23, a to-be-performed inspection item, an inspection result received by the operation reception unit 271, a date and time when inspection is performed, and vehicle registration information of the vehicle 1 to be inspected to the external apparatus 3 in association with one another.

The external apparatus 3 stores the image generated by the image-capturing device 23, the to-be-performed inspection item, the inspection result, the date and time when the inspection is performed, and the vehicle registration information in association with one another. Since the external apparatus 3 stores the image generated by the image-capturing device 23 as history information, the administrator of the inspection assistance system S can refer to the image when advice or the like is given to the user regarding the inspection method, the determination criterion, or the like of the pre-operation inspection.

[Processing Procedure of Operation of Device by Inspection Assistance Apparatus]

Figure 9:
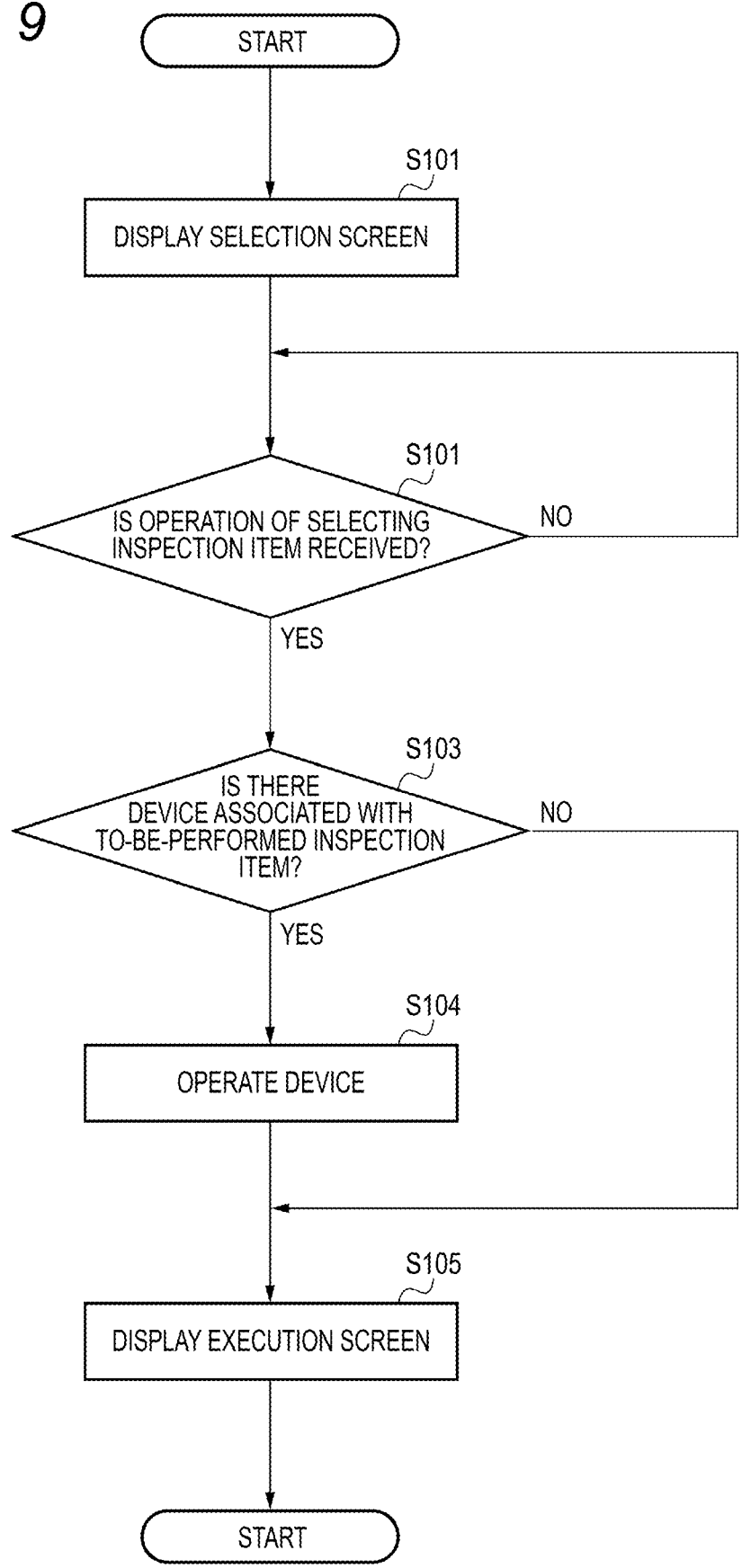
FIG. 9 is a flowchart showing a processing procedure of an operation of a device by the inspection assistance apparatus.

FIG. 9 is a flowchart showing a processing procedure of an operation of a device by the inspection assistance apparatus 2. The processing procedure is started when the operation reception unit 271 receives an operation of instructing a display of a selection screen.

First, the display control unit 272 causes the selection screen to be displayed (S101). Next, the device control unit 273 determines whether the operation reception unit 271 has received an operation of selecting one to-be-performed inspection item from the plurality of inspection items displayed on the selection screen (S102). When determining that the operation reception unit 271 has received the operation of selecting the to-be-performed inspection item (YES in S102), the device control unit 273 determines whether there is a device associated with the selected to-be-performed inspection item in the storage unit 26 (S103).

When there is the device associated with the selected to-be-performed inspection item in the storage unit 26 (YES in S103), the device control unit 273 causes the device to operate (S104). The display control unit 272 causes a performing screen for performing the selected to-be-performed inspection item to be displayed (S105), and ends the processing.

When determining that the operation reception unit 271 has not received the operation of selecting one to-be-performed inspection item in the determination of S102 (NO in S102), the device control unit 273 repeats the determination of S102. When determining that there is no device associated with the selected to-be-performed inspection item in the storage unit 26 in the determination of S103 (NO in S103), the device control unit 273 proceeds to a processing of S105 without causing the device to operate.

[Effects of Present Disclosure]

According to the present embodiment, the device control unit 273 causes the device that is provided in the inspection assistance apparatus 2 and that is associated with the to-be-performed inspection item selected on the selection screen to operate. With such a configuration, since the device is operated in conjunction with the selection of the to-be-performed inspection item, the user U can omit an operation for operating the device. Therefore, the device control unit 273 can facilitate the inspection of the inspection item that requires the device.

[Modification of Inspection Assistance System]

In the present embodiment, an example in which the display control unit 272 and the device control unit 273 of FIG. 4 are installed in the inspection assistance apparatus 2 has been described. However, the present disclosure is not limited thereto. For example, the display control unit 272 and the device control unit 273 may be installed in an apparatus different from the inspection assistance apparatus 2.

Figure 10:
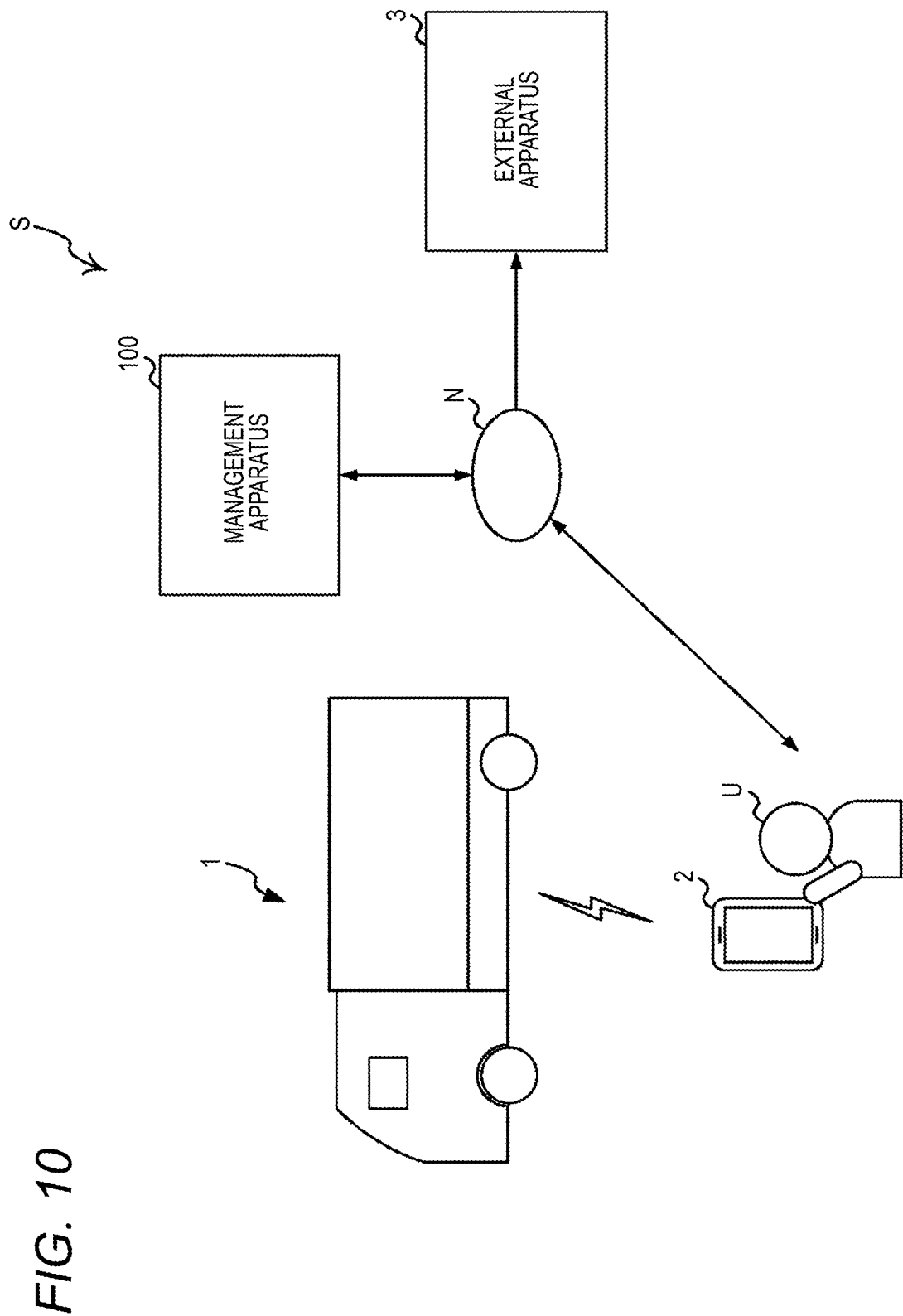
FIG. 10 is a diagram showing a configuration of another inspection assistance system.

FIG. 10 is a diagram showing a configuration of another inspection assistance system S. The inspection assistance system S of FIG. 10 includes the inspection assistance apparatus 2 for assisting inspection of the vehicle 1, the external apparatus 3 related to the inspection of the vehicle 1, and a management apparatus 100 for managing the inspection. The management apparatus 100 is connected to the inspection assistance apparatus 2 via the network N. The management apparatus 100 may be a single server or a cloud server configured with a plurality of servers.

The management apparatus 100 includes a display control unit and a device control unit. Since the display control unit and the device control unit are respectively similar to the display control unit 272 and the device control unit 273 of FIG. 4, description thereof will be omitted. The management apparatus 100 may be the same server as that of the external apparatus 3.

Although the present disclosure has been described above using the embodiment, the technical scope of the present disclosure is not limited to the scope described in the above embodiment, and various modifications and changes can be made within the scope of the gist of the present disclosure. For example, all or some of the apparatuses can be functionally or physically distributed or integrated in any unit. Further, a new embodiment generated by any combination of a plurality of embodiments is also included in the embodiment of the present disclosure. Effects of the new embodiment generated by the combination include effects of the original embodiment.

The present application is based on a Japanese Patent Application filed on Jun. 13, 2019 (Japanese Patent Application No. 2019-110525), and contents of which are incorporated herein by reference.

INDUSTRIAL APPLICABILITY

An inspection assistance program, an inspection assistance system, and a method for controlling an inspection assistance apparatus according to the present disclosure can facilitate inspection of an inspection item that requires an instrument.

REFERENCE SIGNS LIST

1: vehicle
2: inspection assistance apparatus
3: external apparatus
11: in-vehicle wireless device
12: various lamps
13: various sensors
14: ECU
21: communication unit
22: light
23: image-capturing device
24: touch panel
25: display unit
26: storage unit
27: control unit
100: management apparatus
141: storage unit
142: control unit
271: operation reception unit
272: display control unit
273: device control unit
274: communication control unit

The invention claimed is:

1. A non-transitory computer readable medium storing an inspection assistance program for assisting inspection of a vehicle, the inspection assistance program causing a computer to function as:
   a display controller configured to cause a display to display a selection screen for selecting one to-be-performed inspection item from a plurality of inspection items; and a device controller configured to cause a device that is provided in an inspection assistance apparatus and that is associated with the to-be-performed inspection item selected on the selection screen to automatically operate, wherein, when inspection of a liquid amount of a battery of the vehicle is selected as the to-be-performed inspection item on the selection screen, the device controller boots an image-capturing device configured to generate an image to be activated as the device associated with the to-be-performed inspection item, and causes a light to be turned on as the device associated with the to-be-performed inspection item.

2. The non-transitory computer readable medium according to claim 1, wherein the inspection assistance program further causes the computer to function as a transmission unit configured to transmit the image generated by the image-capturing device to an external apparatus related to the inspection in association with the to-be-performed inspection item.

3. An inspection assistance system for assisting inspection of a vehicle, comprising:

an inspection assistance apparatus; and
a management apparatus for managing the inspection,
wherein the inspection assistance apparatus includes a display configured to display a selection screen for selecting one to-be-performed inspection item from a plurality of inspection items, the management apparatus includes:
a display controller configured to cause the display to display the selection screen; and
a device controller configured to cause a device of the inspection assistance apparatus associated with the to-be-performed inspection item selected on the selection screen to automatically operate, and when inspection of a liquid amount of a battery of the vehicle is selected as the to-be-performed inspection item on the selection screen, the device controller boots an image-capturing device configured to generate an image to be activated as the device associated with the to-be-performed inspection item, and causes a light to be turned on as the device associated with the to-be-performed inspection item.

4. A method for controlling an inspection assistance apparatus for assisting inspection of a vehicle, comprising the steps of causing the inspection assistance apparatus to:

cause a display to display a selection screen for selecting one to-be-performed inspection item from a plurality of inspection items;

cause the inspection assistance apparatus to output a signal for automatically operating a device associated with the to-be-performed inspection item selected on the selection screen; and boot an image-capturing device configured to generate an image to be activated as the device associated with the to-be-performed inspection item, and cause a light to be turned on as the device associated with the to-be-performed inspection item, when inspection of a liquid amount of a battery of the vehicle is selected as the to-be-performed inspection item on the selection screen.

* * * * *